(12) United States Patent
Brucker

(10) Patent No.: US 6,457,742 B1
(45) Date of Patent: Oct. 1, 2002

(54) SIDE COLLISION PROTECTION SYSTEM FOR VEHICLES

(75) Inventor: Roland Brucker, Essingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/600,751

(22) PCT Filed: Dec. 17, 1998

(86) PCT No.: PCT/EP98/08304

§ 371 (c)(1),
(2), (4) Date: Jul. 21, 2000

(87) PCT Pub. No.: WO99/37507

PCT Pub. Date: Jul. 29, 1999

(30) Foreign Application Priority Data

Jan. 22, 1998 (DE) .................................. 298 01 051 U

(51) Int. Cl.[7] ............................................. B60R 21/22
(52) U.S. Cl. .................................... 280/730.2; 280/729
(58) Field of Search ............................ 280/730.2, 729, 280/743.1, 739, 730.1

(56) References Cited

U.S. PATENT DOCUMENTS

| 5,240,283 A | * | 8/1993 | Kishi et al. .................. 280/729 |
| 5,333,903 A | * | 8/1994 | Eyrainer et al. .......... 280/743.1 |
| 5,454,595 A | * | 10/1995 | Olson et al. ............... 280/743.1 |
| 5,584,508 A | * | 12/1996 | Maruyama et al. ...... 280/743.1 |
| 5,765,863 A | * | 6/1998 | Storey et al. ................ 280/729 |
| 5,833,265 A |   | 11/1998 | Seymour |
| 5,899,490 A | * | 5/1999 | Wipasuramonton et al. ..... 280/730.2 |

FOREIGN PATENT DOCUMENTS

| DE | 2944319 | 5/1981 |
| DE | 19541440 | 6/1996 |
| DE | 19806301 | 9/1998 |
| EP | 0686527 | 12/1995 |
| EP | 0798170 | 10/1997 |
| GB | 2314300 | 12/1997 |
| WO | 9937507 | 7/1999 |

* cited by examiner

Primary Examiner—Paul N. Dickson
Assistant Examiner—David R. Dunn
(74) Attorney, Agent, or Firm—Tarolli, Sundheim, Covell, Tummino & Szabo L.L.P.

(57) ABSTRACT

A side impact protection system for vehicles comprises an inflatable gas bag (10) which has a wall made of a material being impermeable to gas, and a gas source (3) for inflating the gas bag. For reducing peak loads upon diving of the occupant into the inflated gas bag there are provided several burst chambers (12, 14, 16) separated in their contour shape from the inflatable volume of the gas bag (10) by retaining means (18). The retaining means (18) of the burst chambers (12, 14, 16) are dimensioned as regards their strength such that the burst chambers (12, 14, 16) is opened towards the inflatable volume of the gas bag (10) once a predetermined value of the gas bag internal pressure, which is lower than the filling pressure of the filling gases provided by the gas source (3), has been attained.

2 Claims, 2 Drawing Sheets

SIDE COLLISION PROTECTION SYSTEM FOR VEHICLES

Figure 1:
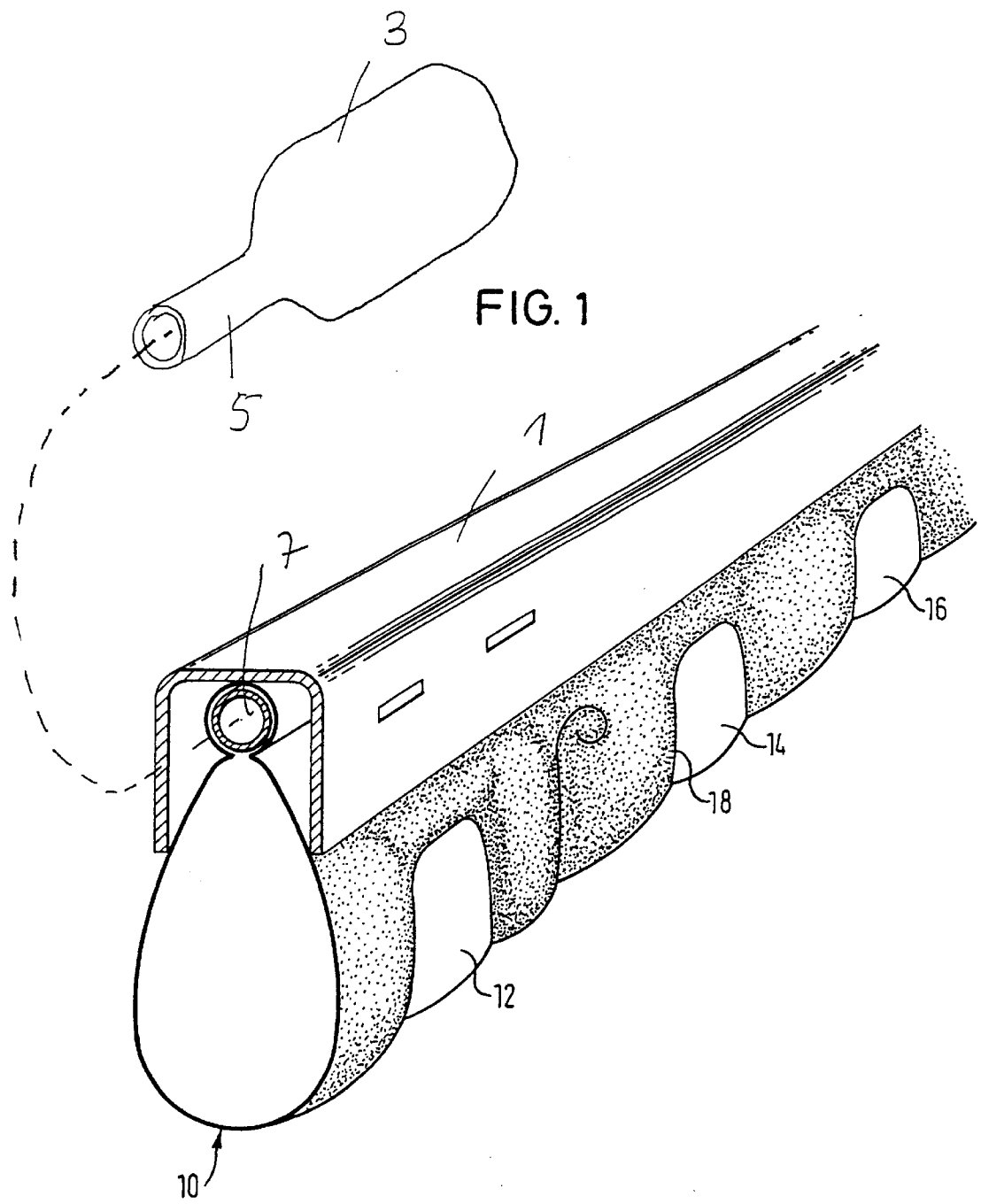

The invention relates to a side impact protection system for vehicles.

Such a protection system comprises an inflatable gas bag and a gas source such as a gas generator for inflating the gas bag. The gas bag is inflated within a few milliseconds when the vehicle is involved in a collision, it serving the vehicle occupant as an impact cushion primarily in protecting the head region, in particular in the case of a side collision. In order to extend the protection to multiple collisions, in particular with regard to a scenario with an overturn of the vehicle or a follow-on crash, the wall of the gas bag is constructed so as to be air-tight to a large extent, so that the gas bag stays inflated for longer than one second, for example. In such a case, however, the impulse of a part of the body penetrating into the gas bag is returned almost completely, as the gas bag constitutes an elastic cushion. A damping of the impact by controlled escaping of the filling gas through a relief opening is out of the question, if the useful life of the gas bag is to be preserved.

The invention thus provides a side impact protection system by which, on the one hand, the kinetic energy of the part of the body penetrating into the gas bag on an impact of the occupant can be depleted whilst, however, maintaining the protective function for the occupant for the duration of a complex course of a crash. This is achieved by a protection system of the aforementioned kind in that at least one burst chamber is provided which is separated in its contour shape from the inflatable volume of the gas bag by retaining means and the retaining means of the burst chamber are dimensioned as regards their strength such that the burst chamber is opened towards the inflatable volume of the gas bag once a predetermined value of the gas bag internal pressure, which is lower than the filling pressure of the filling gases provided by the gas source, has been attained.

Only by the overpressure which arises on a severe penetration of a part of the body into the inflated gas bag, the burst chamber is opened, enabling gas to flow into the hitherto empty burst chamber. As a result of this, the kinetic energy of the penetrating part of the body is depleted whilst the amount of gas in the gas bag is maintained as a whole so that the gas bag remains available for subsequent actions. Since the severity of impact and thus the compression of the gas bag resulting in opening of the burst chamber(s) is also a function of e.g. weight and seating position of the occupant, a protective function is thus attained which takes into account these parameters. Accordingly, impact of a heavy occupant on the gas bag may necessitate the opening of several burst chambers to intercept impact, whereas in the case of a lighter occupant impacting the gas bag at the same velocity it may possibly prove sufficient to open only a single chamber due to the lesser impulse involved.

The embodiment of the gas bag in accordance with the invention results in the further advantage that the risk of the gas bag tearing at extremely high temperatures, involving a stronger expansion of the gas, is diminished due to the possibility of compensating the overpressure by opening one or more burst chambers. Thereby, the volume of the gas bag can be reduced so that even at extremely low temperatures the gas bag is sufficiently filled to offer protection to the occupant.

Apart from those already cited no additional parts proving a nuisance or complicating the system are needed for these enhanced protective functions. Even the accommodation space for the folded gas bag has not to be enlarged.

Preferably the gas bag comprises several burst chambers differing in size, which are opened staggered in time when a part of the body penetrates the gas bag. In this arrangement the various chambers can be configured such that they rip open at differing values of the internal pressure of the gas bag, the values each being exactly predeterminable. By a suitable arrangement of the chambers in the gas bag a protective function can thus be achieved which is optimally adapted to the seating position and impact severity of the vehicle occupant, namely just as many burst chambers of the gas bag then being opened in the region of the point of impact as are needed to intercept the impact as best possible. Accordingly, the above-mentioned individual parameters of a vehicle occupant, such as size, weight and seating position are even better taken into account on making use of the gas bag side impact protection device.

It is of advantage to form the burst chambers with tear seams or alternatively with a bond to permit a defined opening response of the chambers.

Figure 2:
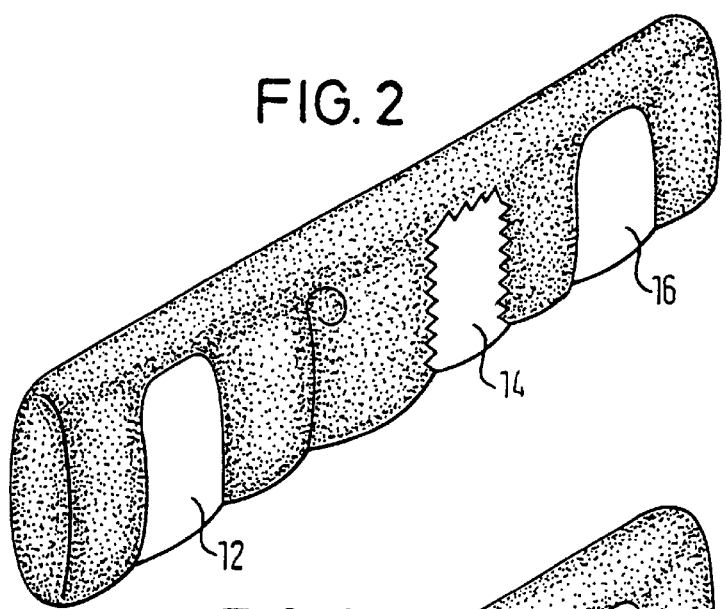
Figure 3:
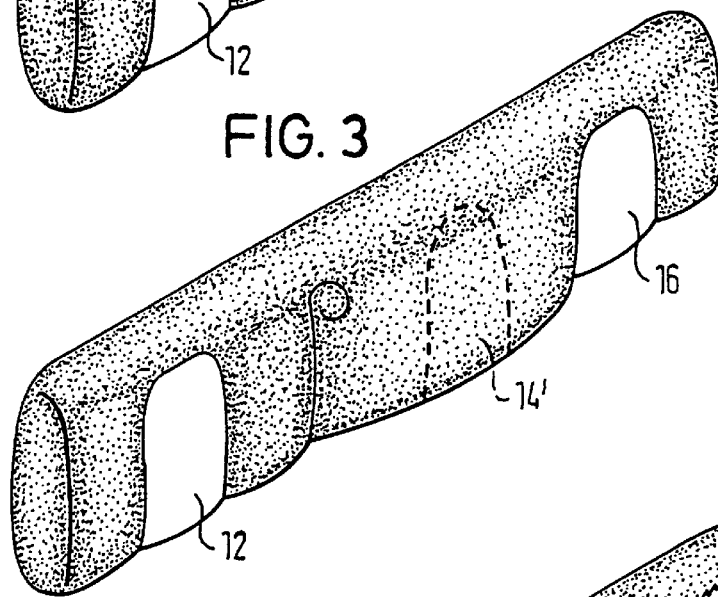
Figure 4:
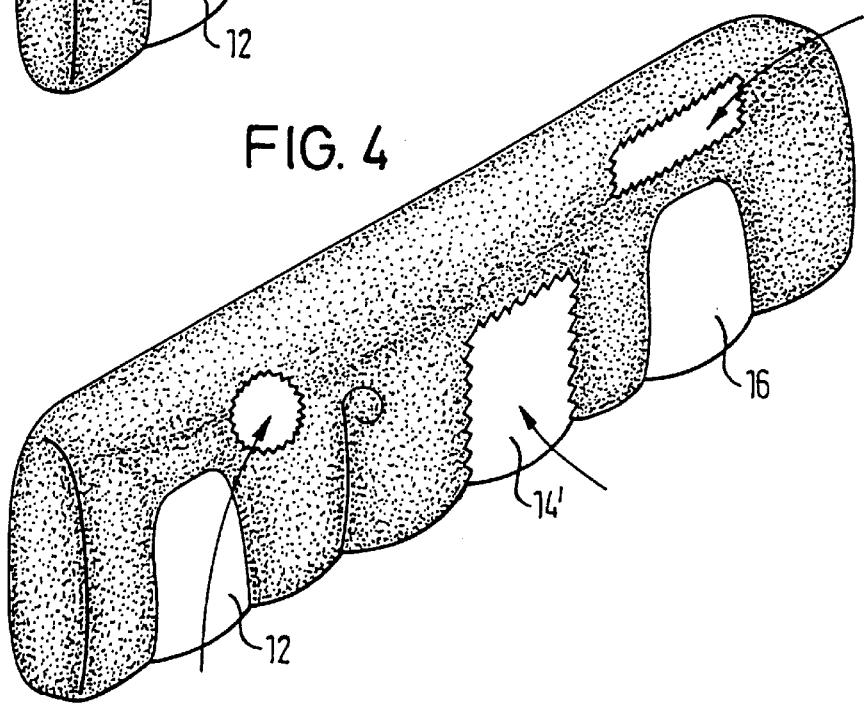

Further features and advantages of the invention read from the following description and the drawing to which reference is made and in which:

FIG. 1 is a perspective view of a protection system with inflated gas bag prior to the impact of a vehicle occupant, FIG. 2 illustrates the gas bag as shown in FIG. 1, indicating a first impact site of a vehicle occupant, FIG. 3 illustrates the gas bag as shown in FIG. 1, with an opened burst chamber after a first impact, and FIG. 4 illustrates the gas bag as shown in FIG. 1, indicating several follow-on impact sites.

The side impact protection system for vehicles shown in FIGS. 1 to 4 comprises an elongated housing 1 in the shape of a U-section, a gas generator 3 and a gas bag 10 which in the normal condition is folded up inside the housing 1. The housing 1 is accommodated below a lining or covering laterally in the vehicle. The gas generator 3 is connected via a feeding pipe 5 with a distribution pipe 7 at the bottom of the housing 1. On activation, the gas generator 3 makes available filling gases for the gas bag with a filling pressure which is known in advance and reproducible within defined limits. The gas bag 10 has an essentially gas-tight wall, in particular by an internal coating, in order to assure a long useful life.

FIG. 1 shows the deployed gas bag 10 in the inflated condition. The gas bag 10 comprises a plurality of burst chambers 12, 14, 16 applied to its outer wall facing the vehicle occupant. The empty burst chambers are separated from the inflatable volume of the gas bag 10 by tear seams 18 in a gas-tight manner to a large extent and are accordingly not filled with gas on deployment of the gas bag 10 following a collision. With regard to the filling pressure, known in advance, of the gas generator 3, the tear seams 18 are dimensioned such that they withstand this filling pressure.

When now, for example, the head of a vehicle occupant impacts a site of the gas bag 10, the gas filling is compressed and a (localized) overpressure occurs in the gas bag 10 (see FIG. 2), which may exceed the normal filling pressure considerably. The forces acting on the tear seams 18 of the burst chamber 14 due to the overpressure result in the tear seams 18 of the burst chamber 14 being ripped open allowing gas to enter into the opened burst chamber 14' (see FIG. 3) without, however, any gas escaping from the overall volume of the gas bag 10. Depending on how severe the impact is, further burst chambers 12, 16 may be opened. In the example shown here, however, only the opened burst chamber 14' is involved. Due to the inflow of gas into the opened burst chamber 14' the kinetic energy of the head of the vehicle occupant is depleted, i.e. the impact speed is reduced with the penetration process, thus more or less intercepting the rebound, decidingly reducing the risk of injury by a subsequent collision with a part of the vehicle or another vehicle occupant.

Should after the first collision the vehicle be involved in an overturn or any further collision(s) as a result of one or more follow-on crashes then it may happen that the vehicle occupant is hurled against the gas bag 10 several times, possibly against other locations than in the first impact, as evident from FIG. 4. Since in all, no gas can escape from the gas bag 10, the gas bag 10 is available every time as an impact cushion for protecting the vehicle occupant. Depending on the position and severity of the follow-on impacts further burst chambers 12, 16 may be opened as described above.

What is claimed is:

1. A side impact protection system for helping to protect an occupant of a vehicle, said system comprising:

an inflatable gas bag having an inflatable volume and a gas source, said gas source providing filling gases for filling said inflatable volume of said gas bag to a filling pressure, the wall of the gas bag being essentially gas-tight due to an internal coating, said gas bag further comprising a plurality of burst chambers and a plurality of tear seams separating said burst chambers from said inflatable volume of said gas bag in an essentially gas tight manner, said burst chambers not being filled with said filling gas on inflation, each of said tear seams having a value of tearing strength, said values of tearing strength being such that said burst chambers open with differing values of internal pressure of said gas bag, said values of internal pressure exceeding said filling pressure of said filling gases provided by said gas source.

2. The side impact protection system set forth in claim 1, wherein said burst chambers are each differing in size.

* * * * *